No. 895,358.

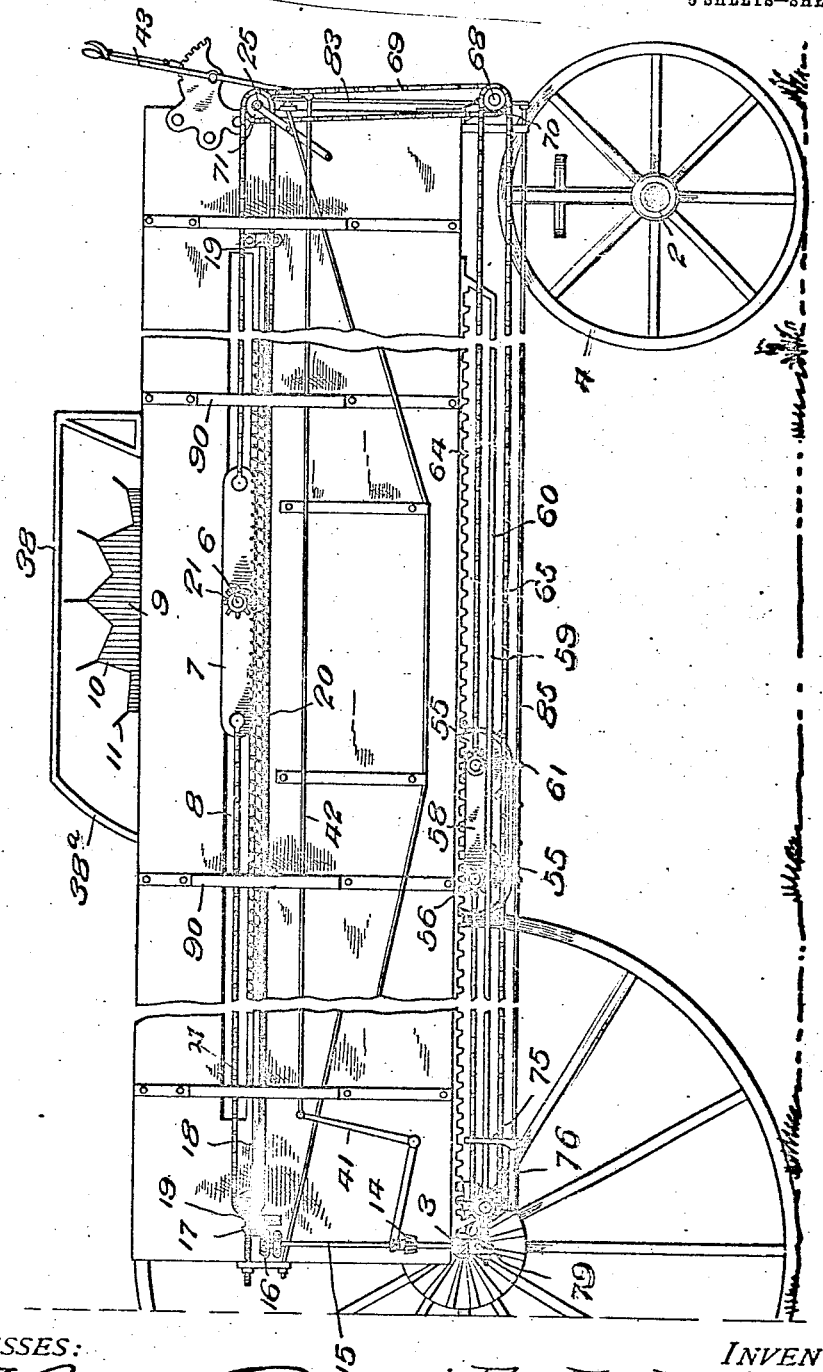

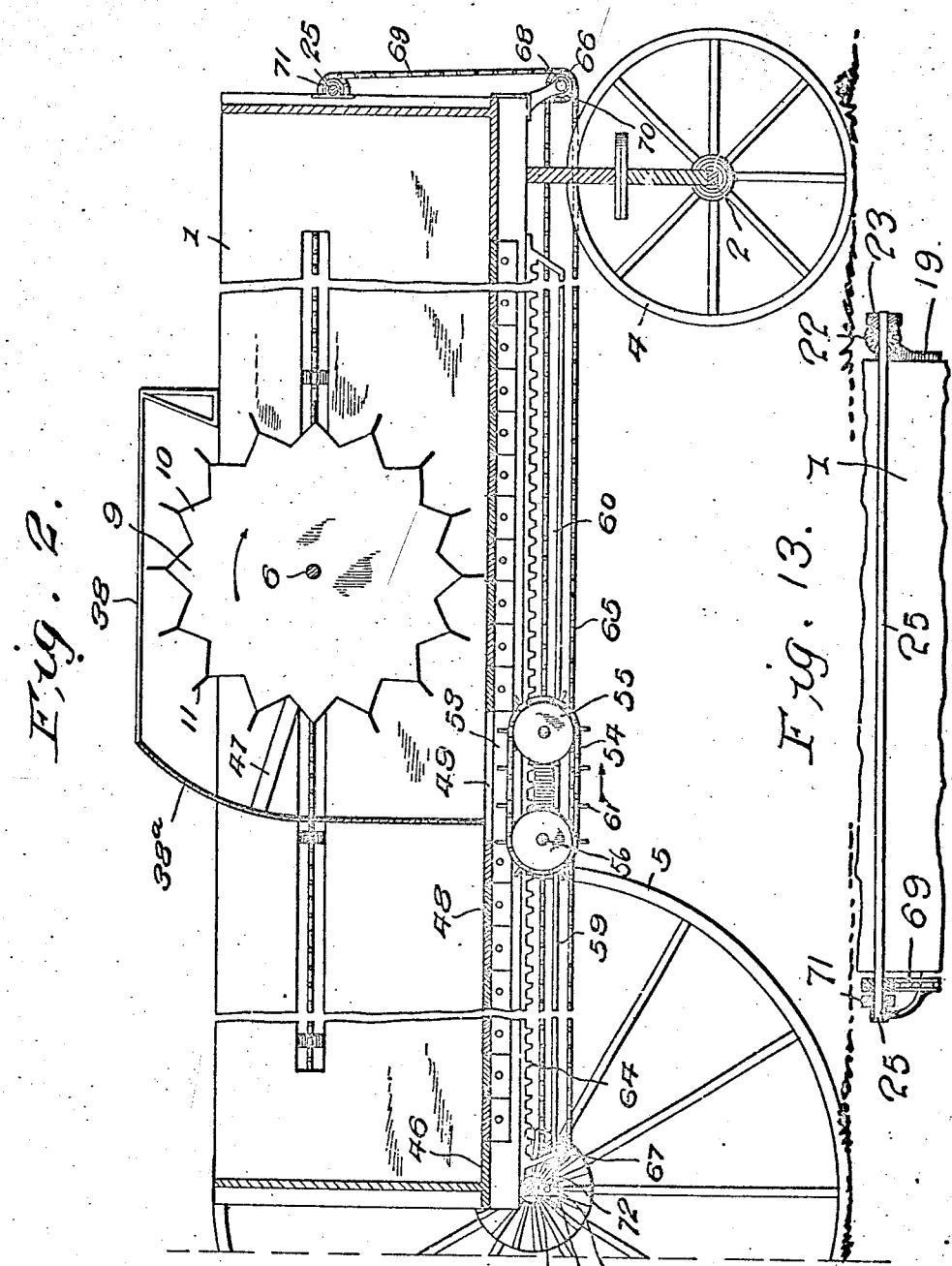

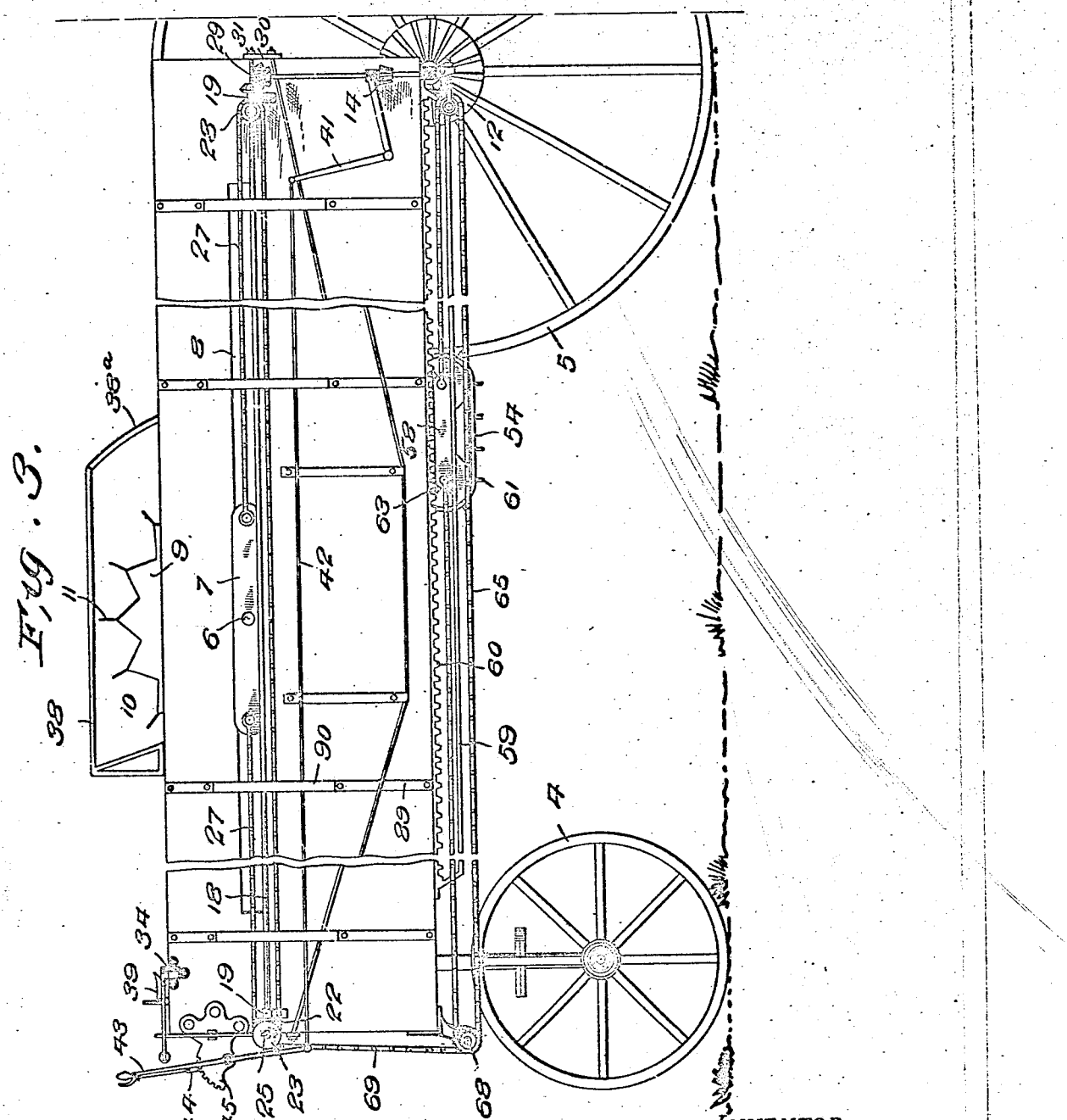

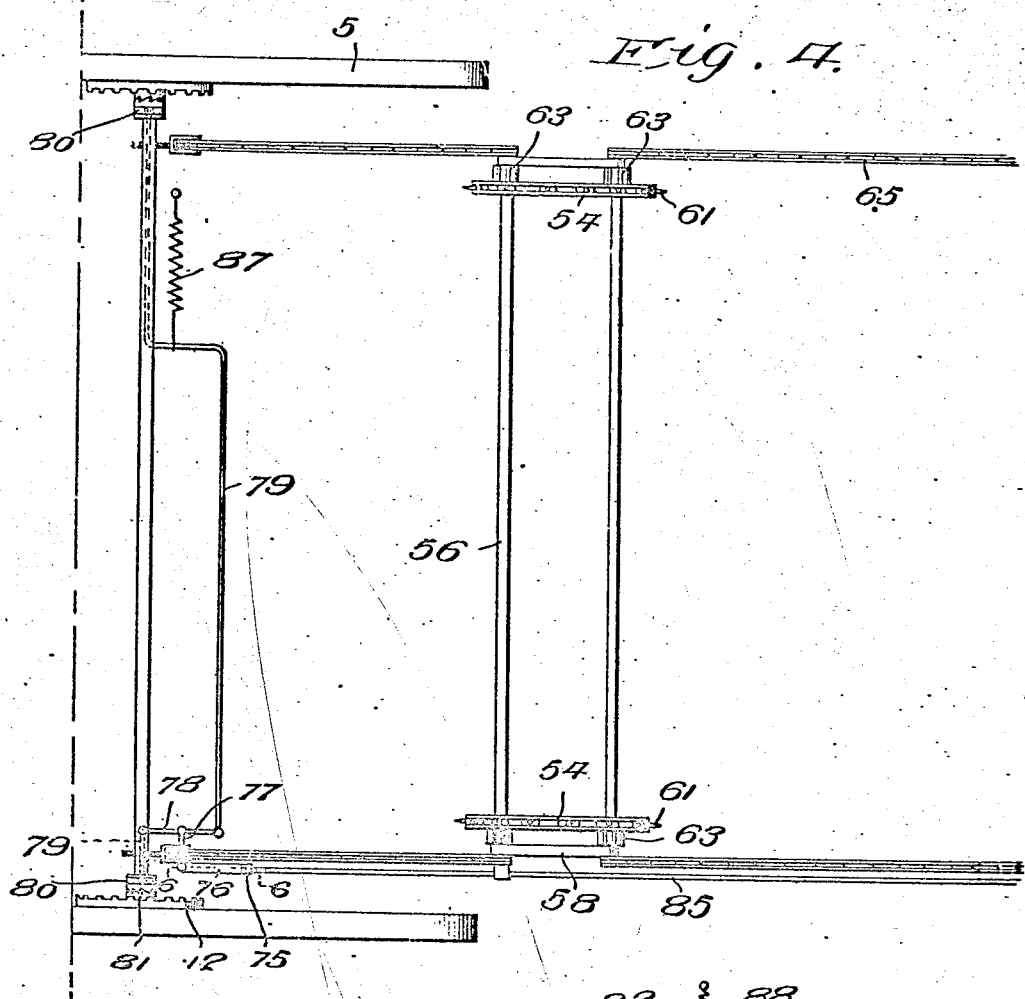

A. A. FOKKEN.
MANURE SPREADER.
APPLICATION FILED DEC. 24, 1907.

PATENTED AUG. 4, 1908.

5 SHEETS—SHEET 5.

WITNESSES:
Thos. W. Riley
S. W. ......

INVENTOR
A. A. Fokken
BY
W. J. FitzGerald
Attorneys

UNITED STATES PATENT OFFICE.

ADELBERT ANTON FOKKEN, OF RAYMOND, SOUTH DAKOTA.

MANURE-SPREADER.

No. 895,358.

Specification of Letters Patent.

Patented Aug. 4, 1908.

Application filed December 24, 1907. Serial No. 407,934.

*To all whom it may concern:*

Be it known that I, ADELBERT ANTON FOKKEN, a citizen of the United States, residing at Raymond, in the county of Clark and State of South Dakota, have invented certain new and useful Improvements in Manure-Spreaders; and I do hereby declare the following to be a full, clear, and exact description of the invention, such as will enable others skilled in the art to which it appertains to make and use the same.

My invention relates to new and useful improvements in manure spreaders and my object is to mount the operating parts upon a running gear, whereby the manure may be transported from place to place, as well as scattered.

A further object is to provide means for disintegrating the manure previous to scattering the same upon the ground.

A further object is to provide means for moving the disintegrator from end to end of the spreader.

A still further object is to provide means for automatically shifting the floor sections of the bed of the spreader, as the disintegrator travels from end to end of the bed and a still further object is to provide automatic means for starting or stopping the parts of the spreader.

Other objects and advantages will be hereinafter referred to and more particularly pointed out in the claims.

Figure 7:
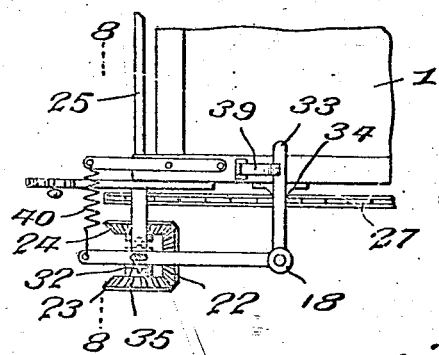
Figure 8:
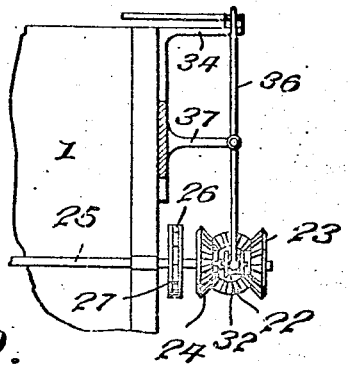
Figure 9:
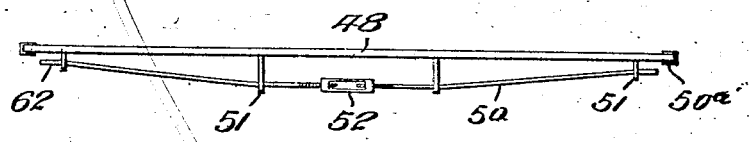
Figure 10:
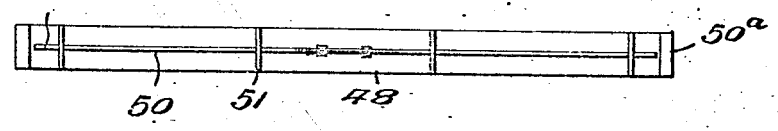
Figure 11:
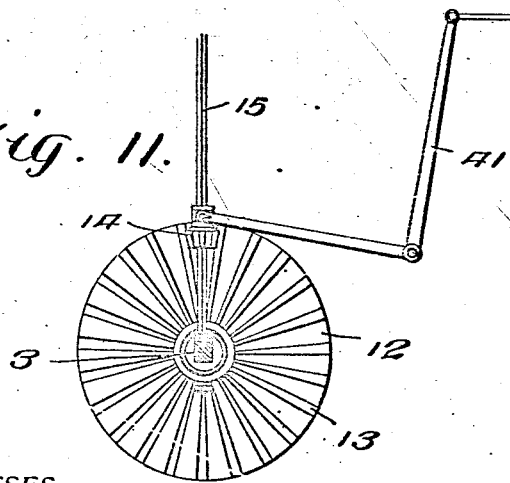
Figure 12:
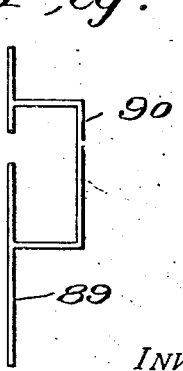

In the accompanying drawings which are made a part of this application, Figure 1 is a side elevation of my improved form of spreader, showing one of the driving wheels removed. Fig. 2 is a longitudinal, central, sectional view through the spreader. Fig. 3 is an elevation of the opposite side of the spreader from that shown in Fig. 1, Fig. 4 is a top plan view of the rear axle of the spreader, showing the automatic means for stopping the operating parts of the spreader. Fig. 5 is a detail front elevation of a trip and operating lever therefor employed in connection with the stopping mechanism. Fig. 6 is a detail sectional view on an enlarged scale, as seen on line 6—6, Fig. 4. Fig. 7 is a detail top plan view of a portion of the forward end of the spreader, showing the automatic reversing mechanism for the disintegrator. Fig. 8 is a sectional view as seen on line 8—8, Fig. 7. Fig. 9 is an edge elevation of one of the movable floor sections. Fig. 10 is a bottom plan view thereof. Fig. 11 is a detail side elevation of one of the driving cogs showing a speed changing mechanism coöperating therewith, and, Fig. 12 is an edge elevation of a bracket used in connection with the spreader. Fig. 13 is a sectional view illustrating certain details of the invention.

Referring to the drawings in which similar reference numerals designate corresponding parts throughout the several views, 1 indicates the bed of my improved spreader, which is mounted upon supporting axles 2 and 3 at opposite ends of the bed, said axles having wheels 4 and 5, respectively, mounted thereon. A shaft 6 extends laterally through the bed 1 and is supported in slides 7, which are slidably mounted in ways 8 in the walls of the bed 1.

Mounted upon the shaft 6 and adapted to rotate therewith, is a disintegrator or beater 9, the periphery of which is provided with a plurality of longitudinally extending ribs 10 and the apex of the ribs are provided with a plurality of spikes 11. The beater 10 is adapted to be moved from end to end of the bed 1 and rotate at the same time, so that the contents of the bed will be thoroughly disintegrated and moved to a suitable discharge opening, and, in accomplishing this result, each of the wheels 5 have secured thereto a disk 12, the inner face of which is provided with teeth 13, with which is adapted to mesh a pinion 14, slidably mounted on a vertically disposed shaft 15, said shaft being preferably square in cross section to fit a similarly constructed opening through the pinion 14, thereby permitting the pinion to be moved longitudinally on the shaft and, at the same time, rotate the shaft, the lower end of the shaft 15 being mounted in any suitable form of bearing on the axle 3.

The upper end of the shaft 15 has secured thereto a bevel pinion 16, which meshes with a bevel pinion 17 on a driving shaft 18, said shaft being mounted in brackets 19 on the side of the bed, said shaft resting in a horizontal position and adjacent the path of the slide 7 there being a driving shaft 18 and operating mechanism therefor at each side of the bed 1, one of said shafts having a worm 20 thereon, which is adapted to engage a gear 21 secured to one end of the shaft 6 and is employed for rotating the beater 9, while the shaft 18 at the opposite side of the bed is provided at its forward end with a bevel pinion 22, which meshes with pinions 23 and 24 on a shaft 25. The shaft 25 is also provided at opposite sides of the bed 1 with sprocket wheels 26 around which take sprocket chains 27, the free ends of said chains being secured to the ends of the slides 7, said chains also passing around sprockets 28 at the opposite end of the bed, said sprockets 28 being secured to adjusting bolts 29, which are in turn extended through plates 30 on the bed and provided on their outer ends with nuts 31 by which means the tension of the chains may be regulated. By this construction it will be readily seen that when the spreader is moved forwardly, motion will be imparted to the shafts 18, one of said shafts moving the beater longitudinally of the bed 1 through the medium of the chains 27, while the worm 20 on the opposite shaft 18 will rotate the beater through the medium of the gear 21 and, by placing the beater at the rear end of the bed and placing the article to be distributed between the beater and the forward end of the bed 1, said substance will be successively engaged and disintegrated by the beater as said beater travels towards the forward end of the bed.

The gears 23 and 24 are rotatably mounted on the shaft 25, so that when one of the gears is rotating said shaft the opposite gear will run free thereon and, in order to fix the shaft to the gears, a clutch 32 is feathered, or otherwise secured to the shaft 25 between the gears 23 and 24 and is adapted to alternately engage said gears to reverse the travel of the beater in the bed and, in order to automatically shift the clutch from engagement with the gear 23 when said gear is employed for moving the beater towards the forward end of the bed into engagement with the gear 24 to move the beater to the rear end of the bed, I provide a bell-crank lever 33, which lever is pivotally secured to the side of the bed 1 by means of a bracket 34, one arm of the bell-crank lever extending over one edge of the bed, while the opposite arm extends parallel with the side of the bed and over the clutch 32 and, at the point of its passage over the clutch, said arm is provided with a slot 35, through which passes the upper end of a shifting lever 36. The lower end of the shifting lever 36 is preferably bifurcated to span the clutch 32 and, by pivotally securing the shifting lever 36 to a bracket 37 adjacent its longitudinal center, it will be seen that when the bell crank lever is rocked on its pivot point, the clutch 32 will be moved longitudinally on the shaft 25 and engaged, respectively, with the gears 23 or 24.

The bell-crank lever is automatically operated to shift the clutch 32 from engagement with the gear 23 into engagement with the gear 24, by arms 38 carried by a shield 38ª, which is adapted to travel with the beater 9, coming in contact with that arm of the bell-crank lever extending over the edge of the bed 1, the forward movement of the shield rocking the bell-crank lever and operating the shifting lever 36 and the shifting lever is held in its shifted position by means of a latch 39 carried by the bed 1 engaging the arm of the bell-crank lever extending over the edge of the bed when said arm is moved forward. When it is desired to return the clutch 32 into engagement with the gear 23, the latch 39 is released from the bell-crank lever and said lever is returned to its normal position by means of a spring 40, one end of the spring being secured to that arm of the bell-crank lever extending over the clutch 32, while the opposite end thereof is secured in any preferred manner to the bed 1.

The travel of the beater 9 longitudinally of the bed and the rotation of the beater may be quickly increased or decreased by raising or lowering the pinions 14 on the shafts 15 and, to readily accomplish this result, the bell crank levers 41 are pivotally secured to the opposite sides of the bed, one arm of each of said levers being pivotally secured to the pinions 14, while the opposite arms are secured to pitmen 42, the forward ends of said pitmen being in turn secured to the lower ends of levers 43, said levers having latches 44 thereon adapted to engage teeth upon rack bars 45, said bars being preferably secured to the forward end of the bed and in position to be readily operated by the attendant. The shield 38ª is placed in the rear of the beater 9 and the lower end thereof is adapted to engage the floor 46 of the bed, said lower end serving as a scraper to thoroughly remove all particles of the manure from the floor, as the shield is moved forwardly, said shield being provided at its edges with straps 47, which are in turn secured to the slides 7 and the lower edge of the shield is held in engagement with the floor by placing the free ends of the arms 38 in position to travel upon the edges of the bed 1, said arms holding the shield against tilting. As the disintegrated particles are to be discharged from the bed immediately in the rear of the beater 9 and, as said beater travels from the rear to the forward end of the bed, it is necessary to provide means for shifting the position of the discharge opening and cause the same to travel with the beater and, to this end, the major portion of the floor 46 is built up of sections 48, the ends of which are slidably mounted in grooves 49 in the walls of the bed and, to prevent undue wear of the sections, metallic clips 50ª are introduced over the ends thereof, which clips are adapted to rest in the grooves.

The sections 48 are strengthened longitudinally, so as to prevent the same from sagging when weight is placed thereon by means of rods 50, said rods being supported in position on the sections 48 by means of ears 51, the rods being fixed to the ears adjacent the outer ends of the sections, while the meeting ends of the rods are threaded to receive a turn buckle 52. The sections 48 are less in number than is necessary to completely fill the space at the lower edge of the bed, thereby forming a discharge opening 53 and, in order to cause said opening to travel with the beater 9, the sections 48 are successively shifted rearwardly, as the beater travels forwardly by providing a shifting mechanism, which consist of sprocket chains, or the like 54, which are adapted to travel around sprocket wheels 55 carried by shafts 56, said shafts being rotatably mounted in slide bars 58, which are in turn slidably mounted in a frame 59 on the lower edge of the bed, said frames having longitudinally extending slots 60 therein to receive the slide bar.

Secured to the peripheral faces of the sprocket chains 54 are fingers 61, which fingers are adapted to engage the ends 62 of the rods 50, said ends extending beyond the outer ears 51 and in the path of said fingers and, as the shafts 56 are rotated, the fingers will be successively brought into engagement with the ends 62 and the sections 48 moved laterally. The shafts 56 are rotated by means of cogs 63, engaging teeth 64 formed integral with the upper wall of the slot 60, rotating motion being imparted to said shafts by moving the slide bars 58 longitudinally of the slots 60 and the sections 48 are so arranged that but one of the sections will be moved laterally at a time, thereby normally leaving the discharge opening 53 open its full width, the speed of the sprocket wheels 55 being greater than the longitudinal movement of the slide bars and the shield 38ª is so arranged that each section when moved rearwardly, will pass slightly beyond the shield, the lower end of the shield removing any of the product of the bed adhering to the section. The shafts 56 and parts carried thereby are moved longitudinally of the bed by providing sprocket chains 65, which chains pass around sprockets 66 and 67 at the front and rear ends, respectively of the bed, the free ends of said chains being secured at opposite ends of the slide bars 58. The sprockets 66 are secured to a shaft 68 and are driven from the shaft 25 by means of sprocket chains 69 and sprocket wheels 70 and 71 on the shafts 68 and 25, respectively, while the sprockets 67 are carried by adjusting bolts 72, which bolts extend through lugs 73 on the rear axle 3, the outer ends of said bolts being provided with nuts 74, by which means the bolts 72 are adjusted longitudinally. By this construction it will be readily seen that when the beater 9 is being moved towards the forward end of the bed, the sprocket wheels 55 and sprocket chain passing around the same, will be likewise moved forwardly, and simultaneously with the beater and, as the cogs 63 are in engagement with the teeth 64, said sprocket wheels will be rotated and the fingers 61 moved into engagement with the ends 62, the travel of said fingers being faster than the forward movement of the parts carrying the same and thus successively moving the sections 48 to the rear of the shield 38ª, the movement of said sections being at intervals, so that the contents of the bed will readily pass through the opening formed between the separated sections of the floor. The rearward movement of the floor-operating mechanism is also employed for stopping the driving mechanism, one of the shafts 56 being extended beyond the slide bar 58 see Fig. 4 and adapted to engage a trigger, which trigger is rotatably mounted in the end of the socket 76, the socket 76 being in turn pivotally secured to the outer end of an arm 77 carried by a rocking bar 78. The rocking bar 78 is pivotally mounted below the bed 1 and has secured to its opposite ends, oppositely disposed pitmen 79, the ends of the pitmen being in turn secured to clutches 80 carried by the wheels 5, said clutches being adapted to coöperate with the hubs 81 of the disk 12 and impart motion to the disk when the clutches are in engagement therewith.

The rearward movement of the floor-operating parts will bring the projecting end of the shaft 56 into engagement with the trigger 75 and move the socket 76 longitudinally, thereby rocking the bar 78 and pulling the clutches 80 out of engagement with the hubs of the disk 12 and, as long as the extended end of the shaft remains in engagement with the trigger, the clutches will be held out of engagement with the disk and the operating parts of the spreader remain stationary.

When the bed has been filled with the product to be distributed, the spreader is driven to the point of depositing the contents of the spreader when the clutches 80 are again thrown into engagement with the hubs of the disk 12, which is accomplished by depressing a foot lever 82 pivoted at its center to the forward end of the bed, said lever being operatively secured to the trigger 75 through the medium of a connecting rod 85, that end of the rod extending through the trigger, being square in cross section and entered into a similarly constructed socket 86 in the pivoted end of the trigger 75, thereby causing said trigger to rotate with the shaft, while, at the same time, the finger may be moved longitudinally of the shaft and it will be readily apparent that when the lever 82 is depressed, the shaft 85 will be rocked and the trigger 75 swung outwardly and out of engagement with the extended end of the shaft 56, when a spring 87, secured to one of the pitmen 79, will immediately throw the clutches 80 into engagement with the hubs on the disk 12.

When the spreader has moved forwardly a sufficient distance to move the projecting end of the shaft 56 out of the path of the trigger 75, pressure on the foot lever 82 is removed and the trigger-operating parts attached thereto, returned to their initial positions by means of a spring 88.

The sides of the bed 1 are reinforced by securing to the outer faces thereof, brackets 89, said brackets being formed in two sections and connected together by means of loops 90, said loops extending around the chains 27 and shafts 18 and said loops are so constructed that any suitable form of shield (not shown) may be secured thereto, to prevent particles of the contents of the bed from dropping thereon.

In operation, the beater 9 being at the rear end of the bed 1, that portion of the bed at the front of the beater is filled with manure, or like substance to be scattered over a field and after the bed has been properly filled, the spreader is conveyed to the field and the operating parts of the spreader started in motion by moving the trigger 75 laterally and releasing the latch 39 from the arm of the lever 33, thereby throwing the clutches 80 into engagement with the disks 12 and the clutch 32 into engagement with the gear 23, the forward movement of the spreader causing the beater to travel towards the forward end of the bed and disintegrate the manure therein and move the same in position to pass through the opening 53 in the bottom of the bed and, simultaneously with this movement, the floor-operating parts are moved forwardly and the fingers 61 brought successively into engagement with the ends 62 on the floor section and said section moved rearwardly as the parts of the device are moved forwardly. As soon as the beater has reached the forward end of the bed, the arms 38 will engage the bell-crank lever and move the clutch 32 into engagement with the gear 24, which will reverse the movement of the parts and cause the beater and floor-operating mechanism to travel towards the rear of the bed, the sections of the flooring being successively moved forwardly until all of the sections are at one side of the opening 53, which is the result when the section-operating parts are at the rear end of the bed. As soon as the floor-operating parts have been moved adjacent the rear end of the bed, the projecting end of one of the shafts of said mechanism will engage the trigger 75 and disengages the clutches 80 from the disks when the spreader is again driven to the deposit of manure and the bed filled as before.

The amount of manure spread upon the ground may be readily increased or decreased by operating the levers 43 to raise or lower the pinions 14, thereby increasing or decreasing the speed of the operating parts.

It will thus be seen that I have provided a very efficient form of manure spreader and one that will automatically stop the operation of the parts thereof. It will further be seen that the particles distributed by the spreader will be thoroughly disintegrated before being deposited upon the ground and it will likewise be seen that the amount of the particles being deposited upon the ground may be readily increased or decreased by increasing or decreasing the speed of the operating parts of the spreader.

While the element 10, has been hereinbefore referred to as a beater or disintegrator, it may also be known as a distributer as it is through the rotation of this element that the manure is caused to be discharged or distributed.

What I claim is:

1. In a manure spreader of the class described, the combination with a bed, supporting axles for the bed and wheels on said axles: of a beater slidably mounted in the bed, a bottom in said bed formed of sections, said sections being in a common plane, means to move said beater from end to end of the bed and simultaneously rotate the same and means to move the sections of the flooring in their common plane, whereby an opening will be provided in the rear of the beater.

2. In a manure spreader, a receptacle having a bottom formed in sections, a distributing means within the receptacle movable over the bottom of the receptacle, and means for moving the sections of the bottom away from the distributing means in a common plane after the distributing means has passed thereover.

3. In a manure spreader, a receptacle having a bottom formed in sections arranged in the same plane, a distributing means within the receptacle movable over the bottom of the receptacle, and means for moving each section of the bottom away from the distributing means in a common plane after the distributing means has passed thereover.

4. In a manure spreader, a receptacle having a bottom formed in sections, a distributing means within the receptacle movable over the bottom of the receptacle, and means independent of the distributing means for imparting movement to the sections of the bottom in a common plane.

5. In a manure spreader, the combination with a bed having slots therein of slides in said slots, a shaft extending laterally through the bed and through said slides, a beater fixed to said shaft, a shield in the rear of said beater, chains secured to said slides, sprocket wheels at opposite ends of the bed to receive said chains, means to rotate said wheels, whereby the beater will be moved from end to end of the bed and automatic means for reversing the rotation of said sprockets when the beater has reached the forward end of the bed.

6. A spreader of the class described, comprising the combination with a bed, a beater mounted in said bed and means to move the beater from end to end of the bed; of a floor in said bed formed of sections, the bed having grooves to receive the ends of the sections, reinforcing rods below said sections and means below the sections adapted to engage the ends of said rods and move the sections, whereby an opening will be formed in the rear of the beater.

7. A spreader of the class described, comprising the combination with a bed, a beater rotatably mounted in the bed and means to move the beater longitudinally of the bed; of a floor in said bed formed of sections, brace rods for said sections, sprocket wheels rotatably and movably mounted below said sections, sprocket chains on said wheels, fingers on said sprocket chains adapted to engage the projecting ends of the brace rods and move the sections and means to move said sprocket wheels forwardly and rearwardly in coöperation with the movement of the beater, whereby the opening formed by the shifting sections, will be retained immediately in the rear of the beater.

8. In a spreader of the class described, the combination with a bed, a beater slidably mounted in the bed, means to move the beater from end to end of the bed, supporting axles for said bed and wheels on said axles; of disks rotatably mounted on the hubs of two of said wheels, clutches adapted to coöperate with said disks and cause the same to rotate with the wheels, vertically disposed shafts adjacent said disks, pinions mounted on said shafts, teeth on the inner face of said disks, with which said pinions are adapted to mesh, means to raise and lower said pinions, whereby the rotation of said shafts will be increased or decreased and means at the upper ends of said shafts to impart motion to the beater propelling means and additional means to automatically release said clutches from the disks.

9. In a spreader of the class described, the combination with a bed, a beater in said bed, means to move said beater longitudinally of the bed and rotate the same, movable floor sections in the bed, and means to move said sections; of supporting axles for the bed, wheels on said axles, clutches on said wheels, disks loosely mounted on said wheels adapted to be engaged by said clutches, pitmen secured to said clutches, a trigger connected to said pitmen, said trigger being adapted to be engaged by parts of the floor-shifting mechanism and move the clutches out of engagement with the disks and means to swing said trigger laterally and disengage the same from the floor-shifting mechanism and permit the clutches to engage the disks.

10. In a manure spreader, a receptacle having a bottom formed in sections, a distributing means within the receptacle, and a traveling movable means for shifting the sections of the bottom in a direction opposite to the travel of the movable means.

11. In a manure spreader, a receptacle having its bottom formed in movable sections, a reciprocating distributing means within the receptacle, a movable means for imparting movement to the sections of the bottom, and means under control of the section operating means for reversing the direction of motion of the distributing means when the distributing means has reached the limit of its movement in one direction.

12. In a manure spreader, a receptacle having its bottom formed in sections, a reciprocating distributing means within the receptacle, and means for shifting the sections of the bottom to form an opening adjacent the distributing means in both of its direction of movement.

13. In a manure spreader, a receptacle having its bottom formed in sections, means for imparting movement to the sections, a distributing means within the receptacle, and a shield for the distributing means contacting with the sections to act as a scraper therefor.

14. In a manure spreader, a receptacle having a bottom formed in sections, a distributing means within the receptacle, a traveling means, and a movable means carried by the traveling means for shifting the sections of the bottom, said movable means being operated at a greater speed than the traveling means.

15. In a manure spreader, a receptacle having a bottom formed in sections, a distributing means within the receptacle, a traveling means, and a movable means carried by the traveling means for shifting the sections of the bottom, said movable means going in a direction opposite to the direction of the traveling means.

In testimony whereof I have signed my name to this specification in the presence of two subscribing witnesses.

ADELBERT ANTON FOKKEN.

Witnesses:
JOHN S. DANFORTH,
E. F. CONNER.